Oct. 8, 1968     D. C. BOWMAN     3,405,277
SCANNING DEVICE WITH OUTPUT INDICATING
TRACE AND AXIS COINCIDENCE

Filed May 18, 1965     2 Sheets-Sheet 2

*INVENTOR.*
DONALD C. BOWMAN

BY McLean, Morton &
Brusted

ATTORNEYS

United States Patent Office 3,405,277
Patented Oct. 8, 1968

3,405,277
SCANNING DEVICE WITH OUTPUT INDICATING TRACE AND AXIS COINCIDENCE
Donald C. Bowman, Tulsa, Okla., assignor, by mesne assignments, to Sinclair Research, Inc., New York, N.Y., a corporation of Delaware
Filed May 18, 1965, Ser. No. 456,743
9 Claims. (Cl. 250—219)

My invention relates to the analysis of technical information, and in particular provides an apparatus for generating an electric signal responsive to fluctuations of a graphic curve about an axis.

For many years technical information, for example, operating data relating to the performance of a machine, has been recorded in graphic form, that is, as a trace inked or otherwise marked on a surface, such as paper. Frequently, more than one such trace is marked simultaneously to record the simultaneous occurrence of separate, although related events. Typical of the latter are multitrace seismograms which are produced in seismic prospecting. It is often desirable in the analysis of technical information to utilize the information in the form of an electric signal. As a result, more recently such information has been recorded on magnetic tapes and the like from which it can be directly reproduced as an electric signal to obviate the difficult conversion of the information from graphic to electric form. Nevertheless, particularly in the case of seismograms, information previously recorded in graphic form is still useful, and for that reason there is substantial demand for a method and device capable of converting a trace graphically recorded on a surface into a useful electric signal.

In U.S. Patent No. 3,033,990 to James F. Johnson there is described a method and device for effecting this result in which one or more curves, such as "wiggle-trace" seismograms are reproduced as electric analogs. In some instances, however, for example, where the curve, through recording defects, is discontinuous or where in a plural trace recording extreme intrelacing is encountered, it is not practical to reproduce the curve as an electric analog utilizing devices such as that disclosed in the above noted Johnson patent. In many cases, however, the important information conveyed by the curve is not so much in the shape of the curve as in the face that it has fluctuated about a mean and, hence, the passage of the curve across the axis along which it is drawn can be utilized to detect the information conveyed as well as the peak or crest of the wave. In a typical seismogram, for example, the information conveyed is the time of a particular reflection denoted by a "wiggle" in the curve.

Since interlacing effects and mechanical recording failures are most frequently encountered at the crest and trough of the trace, I contemplate providing a mechanical scanning device which will be responsive to the presence of the trace in question at a position coinciding with the axis along which it is drawn. To this end, it is an important object of my invention to provide an apparatus for scanning one or more traces transversely, as in the case of the above noted Johnson patent, with each scan incrementally displaced along the axis of the curve from the preceding scan such that the scanner wlil have an output signal which responds to the presence of a trace at a position coinciding with its axis.

Since in most commonly encountered traces, for example, in a typical seismogram the axis is not marked on the seismogram, it is a further object of my invention to provide such an apparatus which is capable of sensing the axis or axes along which the trace or traces is or are drawn.

In those instances where plural traces marked along parallel axes are to be converted to electric signals in accordance with my invention, it is a further object of my invention to provide a sequencing controller for sorting the output signals of the scanner into separate channels corresponding to each original trace being scanned.

Fundamentally in accordance with my invention I carry out these and other objects by providing a mechanical scanner which scans the trace or traces transversely with the scans incrementally displaced along the length of the axis or axes of the trace or traces and which is responsive to develop an output signal each time a trace is crossed regardless of the position of the trace. In conjunction with the scanner I employ a programmer operated in synchronism with the scanner into which information concerning the position of the axis or axes of the curve or curves has been introduced, such that the programmer will develop an output signal responsive in time to the position of the axis or axes simultaneously as in the course of each scan of the scanner such position is passed. The two output signals, that is the output signal of the scanner and the output signal of the programmer are then combined to control a signal, for example, in a coincidence gate, which signal is a function of the coincidence and lack of coincidence of the output signals of the scanner and programmer.

In another aspect of my invention, specifically in the case of seismograms, I contemplate that the programmer will be a second scanner operated in synchronism with the first scanner which scans that portion of the seismogram prior to reception of seismic signals in which the traces are substantially steady and fall on the axis about which they fluctuate after the seismic energy is being detected. In this manner accurate information is developed concerning the position of the axis or axes along which the seismogram was made. It will be noted that this aspect of my invention has particular applicability to multitrace seismograms, particularly those made by employing photo-sensitive recording devices utilizing mirror galvanometers, as most frequently in such seismograms the spacing between axes of the various traces is not exactly uniform.

It will be apparent in the case of plural traces that devices such as ring counters can be utilized as sequence controllers in rendering operable various output channels corresponding to the various traces being analyzed.

For a more complete understanding of my invention, reference is made to the appended drawings in which.

Figure 1:
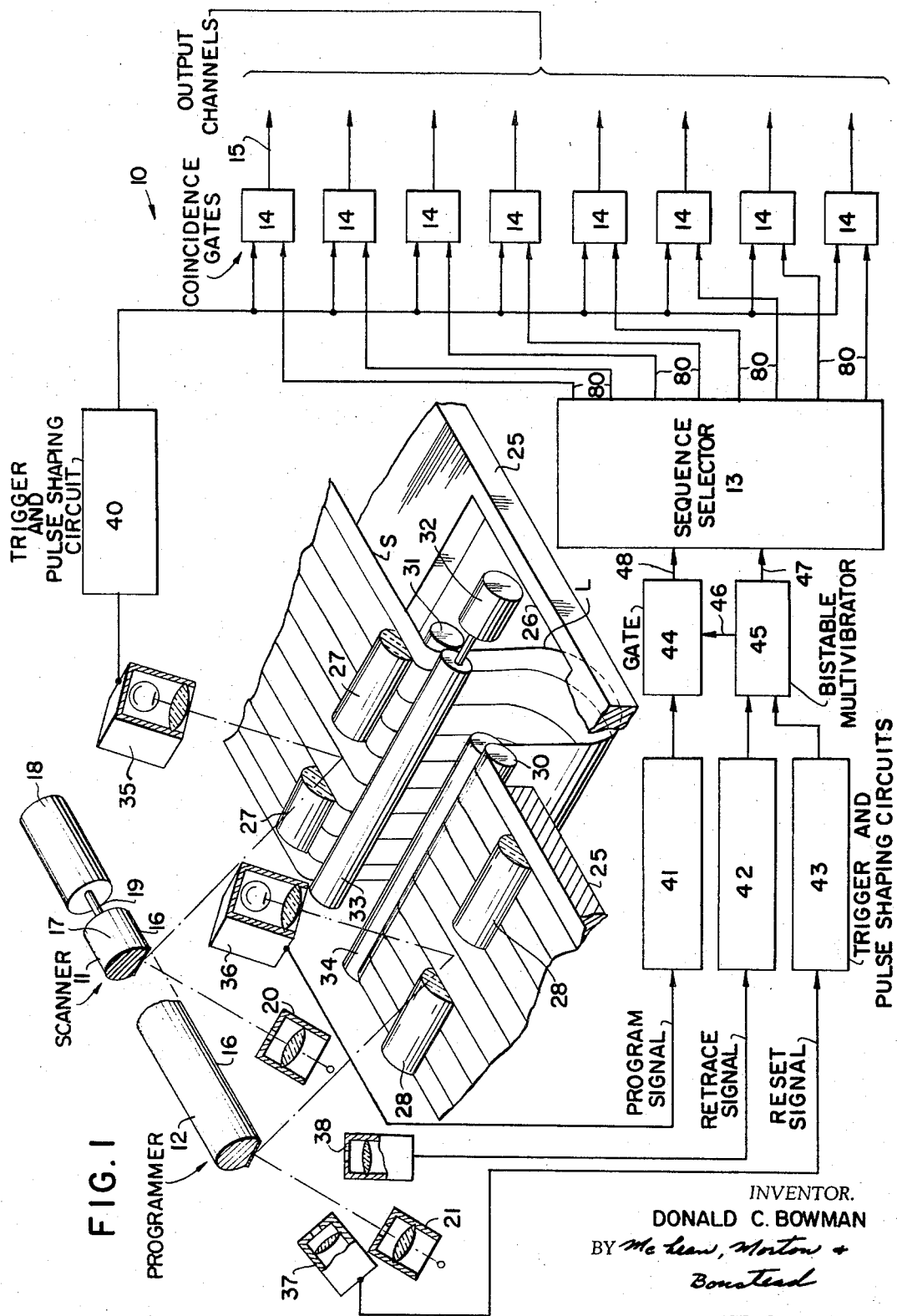
FIGURE 1 is a diagrammatic view of an apparatus in accordance with my invention.

Referring more particularly to FIGURE 1, the reference numeral 10 generally designates an apparatus for converting a plurality of recorded traces into separate electric signals in accordance with my invention. Conversion device 10 basically includes a scanner 11, a programmer 12, a sequence selector 13, eight coincidence gates 14 and eight output channels 15.

Scanner 11 and programmer 12 are each provided with optical systems controlled in synchronism by a common rotating mirror 16 mounted on the flat side of a flatted cylinder 17 driven for rotation about its axis by a motor 18 on the output shaft 19 of which, cylinder 17 is mounted. The scanner optical system includes a light source 20 mounted to cast a ray of light toward mirror 16, while the programmer optical system includes a light source 21 also directed to cast a ray of light toward mirror 16. Light sources 20 and 21 are positioned such that they strike mirror 16 with same angle of incidence.

Associated with scanner 11 and programmer 12 is an elongated table 25 which is provided with a central transverse rectangular aperture 26 and on which a suitable seismogram S can be mounted. Table 25 is positioned in relation to mirror 16 such that on each rotation of mirror 16 the rays of light cast by light sources 20 and 21 will pass transversely across seismogram S. Suitably cylindrical lenses 27 and 28 are mounted over table 25 beneath cylinder 17 positioned to collimate the rays of light respectively from light sources 20 and 21 to fine points as the rays of light impinge upon seismogram S.

Central aperture 26 in table 25 is positioned between the paths of impingement of the light rays emanating from lamps 20 and 21, and a pair of rollers 30 and 31 are mounted in aperture 26 along the opposite transverse edges of aperture 26 such that seismogram S can form a loop L extending between rollers 30 and 31 into aperture 26. A motor 32 driving roller 33 is also mounted in aperture 26 and biased against roller 31, such that seismogram S can be threaded between rollers 31 and 33 and drawn into aperture 26 to form loop L. Roller 30 is, however, provided with a clamp 34 which can be positioned against roller 30 to secure seismogram S in position between them. Thus, when seismogram S is threaded between roller 30 and clamp 34, the end of seismogram S extending on table 25 adjacent roller 30 is held fixed.

Scanner 11 further includes a photo-multiplier tube and suitable optics, indicated generally by the reference numeral 35, which are positioned to have a field of vision corresponding to the path of the ray of light from light source 20 across seismogram S as the ray of light is so directed by mirror 16. Similarly, programmer 12 is provided with a photo-multiplier tube and suitable optics, designated generally by the reference numeral 36, which is positioned to have a field of vision corresponding to the path of the ray of light from light source 21 as such ray of light is cast across seismogram S by rotation of mirror 16. Programmer 12 also has associated with it two additional photo-tubes and suitable optical systems, generally designated by the reference numerals 37 and 38, which are directed toward mirror 16 having narrow fields of vision, responding to the ray of light from light source 21 at the moment it is initially cast by mirror 16 on seismogram S in the case of photo-tube 37 and at the moment before it leaves seismogram S in the case of photo-tube 38.

The entire assembly of scanner 11 and programmer 12 are suitably contained in an enclosure which is partitioned to segregate the various light sources and photo-tubes to prevent spurious responses and which is apertured close to the surface of table 25 in the vicinity of the paths of the rays of light from light sources 20 and 21 as these impinge upon seismogram S. It might be noted in passing that separate light sources 20 and 21 are not necessary and the projection apparatus can have the form of the scanner shown in U.S. Patent No. 3,059,119, to Hughes M. Zenor, which provides a scanner utilizing a single light source and having two separately responsive photo-tube circuits, if the scanner of the Zenor patent is suitably provided with an aperture 26 in the surface supporting the seismogram or other recording being studied.

The electrical circuitry, in addition to sequence selector 13, coincidence gates 14 and output channels 15, includes four trigger circuits which include suitable pulse-shaping circuits, designated by the reference numerals 40, 41, 42 and 43, respectively. Trigger and pulse shaping circuit 40 has its input circuit connected to respond to the output of photo-multiplier 35 to produce an output pulse responsive to a decrease in an intensity of light in the field of vision of photo-multiplier 35. Similarly, trigger and pulse-shaping circuit 41 has its input connected to the output of photo-multiplier 36 and produces an output pulse responsive to a decrease in light intensity in the field of vision of photo-multiplier 36. Trigger and pulse-shaping circuit 42 has its input connected to the output of photo-tube 38 and produces an output pulse responsive to an increase in light intensity in the field of vision of photo-tube 38. Similarly, trigger and pulse-shaping circuit 43 has its input connected to the output of photo-tube 37 and produces an output pulse in response to the presence of light in the field of vision of photo-tube 37.

The output signal of trigger and pulse-shaping circuit 41 is connected to the input of a gate circuit 44 and is normally passed to the output circuit of gate 44. The output signals of trigger and pulse-shaping circuits 42 and 43 are connected to opposite inputs of a bi-stable multi-vibrator 45 having two output circuits designated 46 and 47 responsive to opposite modes of operation of multi-vibrator 45 introduced by signals respectively from trigger and pulse-shaping circuits 42 and 43. The mode of operation of multi-vibrator 45 introduced by a pulse from circuit 42 is connected by circuit 46 to control gate 44 and holds gate 44 closed for the duration of such mode of operation of multi-vibrator 45. The mode of operation of multi-vibrator 45 introduced by a pulse in the output of circuit 43 is connected by circuit 47 to deliver a pulse to sequence selector 13.

Sequence selector 13 typically is a ring counter, the signal input circuit of which is connected to output circuit 48 of gate 44 and the reset input circuit of which is that connected to output circuit 47 of multi-vibrator 45. Sequence selector 13 has eight output channels 80, each of which is connected to an input of a coincidence gate 14. Thus, each pulse passing gate 44 to the input of sequence selector 13 sequentially actuates the input circuit of a different gate 14, while each pulse from multi-vibrator 45 to the reset circuit of selector 13 resets selector 13 to a position potentially ready to actuate an input circuit of a pre-selected initial gate 14 upon the next pulse in the output of gate 44. The second input circuits of each gate 14 are commonly connected to output circuit 73 of trigger and pulse-shaping circuit 40. Each gate 14 is responsive upon simultaneous actuation of both its input circuits to deliver a pulse in the output channel 15 connected to it.

Figure 2:
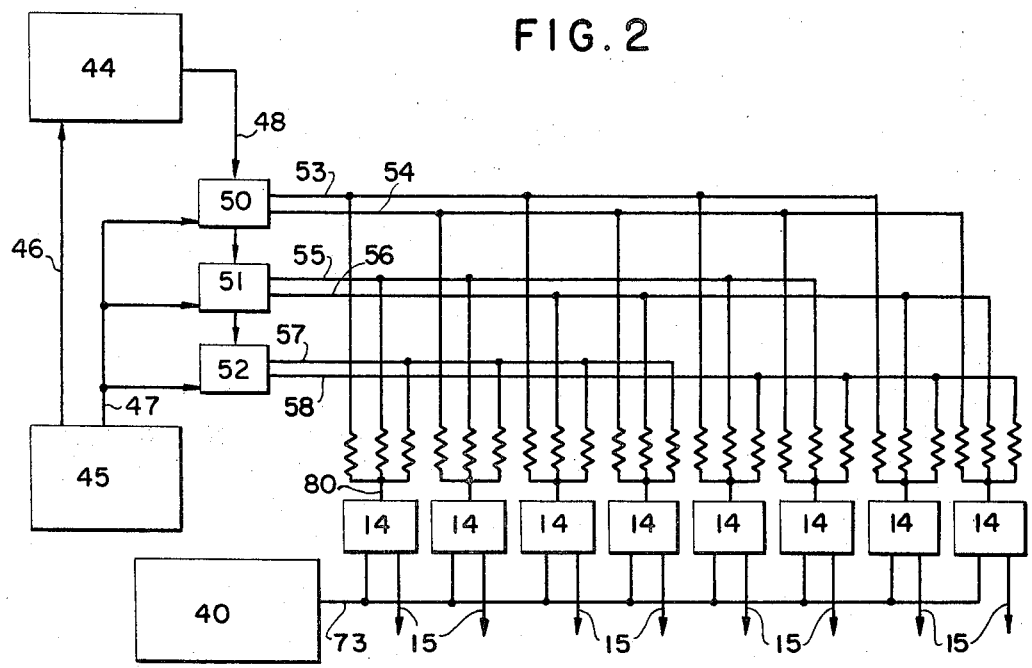
FIGURE 2 is a schematic drawing of a portion of the apparatus shown in FIGURE 1.

Sequence selector 13 can be any ring counter which will sequentially pass a series of input pulses to a number of output circuits and which can be reset to a specific output circuit, and although I have illustrated eight such output circuits 15 in FIGURE 1, as a matter of common knowledge multi-trace seismograms conventionally include 24 or some other high number of parallel traces. Since a conventional ring counter ordinarily includes a series of bi-stable multi-vibrators, such as Eccles Jordan Flip-Flop circuits, so arranged that only one circuit of the series at a time will be in the "on" position, consequently one multi-vibrator is required for each output channel of the ring counter. In practice a large number of multi-vibrators would be required to provide a sequence selector 13 capable of sequentially actuating a large number of output circuits 15 as will be required for a multi-trace seismogram. The number of multi-vibrator circuits can be substantially reduced as is illustrated with respect to FIGURES 2 and 3 which show in greater detail a suitable sequence selector 13. In the selector 13 shown in FIGURE 2, I provide only three multi-vibrators 50, 51 and 52 for the eight output channels 15. It will be noted that the output circuit 48 of gate 44 is connected as an input to multi-vibrator 50 while the output circuit 47 of multi-vibrator 45 is connected as the second input to each of multi-vibrators 50, 51 and 52. Multi-vibrators 50, 51 and 52 are connected in series to form a binary counter by the connection of an output circuit of multi-vibrator 50 as a first input to multi-vibrator 51 and by the connection of an output circuit of multi-vibrator 51 as a first input to multi-vibrator 52. Each of the first input circuits to multi-vibrator 50, 51 and 52 are connected to cause the multi-vibrator to alter its time per mode of operation while the second inputs to each of the multi-vibrators from output circuit 47 of multi-vibrator 45 is connected to put multi-vibrators 50, 51 and 52 in a first mode of operation. The output connections of multi-vibrators 50 and 51 to multi-vibrators 51 and 52, respectively, are such that each change in the mode of operation of multi-vibrators 50 and 51 from the mode set up by a pulse in circuit 47 to the opposite mode will cause the associated multi-vibrator 51 or 52 to alter its mode of operation.

Each of multi-vibrators 50, 51 and 52 has associated with it a pair of output circuits, output circuits 53 and 54 being associated with multi-vibrator 50, output circuits 55 and 56 being associated with multi-vibrator 51, and output circuits 57 and 58 being associated with multi-vibrator 52. Output circuits 53, 55 and 57 are each connected such that they are grounded in the first mode of operation of their associated multi-vibrators and are open circuited in the second mode of their associated multi-vibrators while output circuits 54, 56 and 58 are open circuited in the first mode of operation of their associated multivibrators and are connected to ground in the second mode.

Each of gates 14, as will be discussed more fully with respect to FIGURE 3, has an input circuit 80 effective to open gate 14 upon the simultaneous grounding of three resistors which connect input circuit 80 to a different combination of three of output circuits 53, 54, 55, 56, 57 and 58. In each case, however, one resistor designated 60 for each gate will be connected to one or the other of output circuits 53 and 54, a second resistor designated 61 connected to one or the other of output circuits 55 and 56 and the third resistor designated 62 is connected to one or the other of output circuits 57 and 58. The momentary grounding of output circuits 53–58 at the change of the mode of operation of their associated multivibrators 50, 51 and 52 as discussed above will thus ground certain of resistors 60 and certain of resistors 61 and certain of resistors 62. It will be apparent there are eight different combinations in which a given set of resistors 60, 61 and 62 can be connected to output circuits 53–58 and thus a different such combination is employed for the resistors associated with each gate 14. Thus as each pulse in output circuit 48 triggers multivibrator 50 a sequence of eight different combinations of modes of multivibrators 50, 51 and 52 occurs and the eight gates 14 in sequence are opened momentarily for each pulse in circuit 48.

Figure 3:
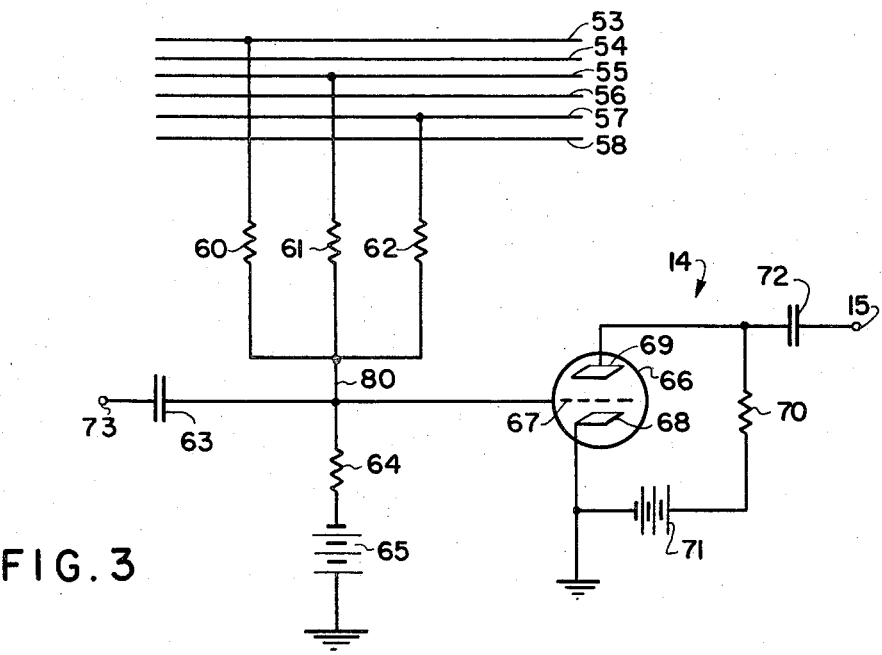
FIGURE 3 is a schematic diagram of a portion of the apparatus shown in FIGURE 2.

A particularly useful circuit which will permit the grounding of three or, for that matter, any number of resistors, to open a gate is shown more completely in FIGURE 3 where it will be observed a particular gate 14 is shown connected through resistor 60 to output circuit 53, through resistor 61 to output circuit 55, and through resistor 62 to output circuit 57. Input circuit 80 to gate 14 at the point of its connection to resistors 60, 61 and 62 is also connected to output circuit 73 of trigger and pulse shaping circuit 40 through an appropriate coupling condenser 63 and through a resistor 64 to the negative side of a battery 65 the positive side of which is grounded. Gate 14 itself is a vacuum tube 66, such as a sharp cut-off triode, having a grid 67 connected to the common junction of resistors 60, 61, 62 and 64 and condenser 63, a grounded cathode 68, and a plate 69 which is connected through a suitable plate resistor 70 to the positive side of a battery 71 the negative side of which is grounded. Resistors 60, 61, 62 and 64 are selected such that the voltage drop across resistor 64 will become sufficiently great when all three resistors 60, 61 and 62 are simultaneously grounded to raise the negative bias of battery 65 at grid 67 just above the cutoff value of tube 66 and such that the voltage drop across resistor 64 is insufficient to do so when only two of resistors 60, 61 and 62 are grounded. Output circuit 15 is suitably coupled to the plate 69 through a condenser 72 such that when all three resistors 60, 61 and 62 are grounded raising the bias on tube 66 above cutoff, a positive pulse from output circuit 73 coupled through condenser 63 to the grid circuit of triode 66 will produce a negative pulse in output circuit 15.

In operation, light sources 20 and 21 and motor 18 are energized. A seismogram S is placed on table 25 between roller 30 and clamp 34 and rollers 31 and 33 forming a loop L as described above. The initial portion of seismogram S (the portion corresponding in time to that prior to the first break from the quiescent state of the geophones) is positioned beneath lens 28 with loop L adjusted in depth such that the portion of seismogram S beneath lens 27 is the first portion of the seismogram having any significant information which is to be reproduced as an electric signal. As motor 18 revolves mirror 16, the rays of light cast by mirror 16 will periodically traverse across seismogram S focused by lens 27 and 28 on the two portions of seismogram beneath lens 27 and 28. Before the reflected ray begins each traverse of seismogram S the ray of light from source 21 will first impinge on photo-tube assembly 37, which is positioned so that it is struck just before the ray of light from source 21 starts its traverse across the quiescent portion of seismogram S. It will be apparent then as each traversing scan commences, a pulse is passed through trigger and pulse-shaping circuit 43 to cause bi-stable multi-vibrator 45 to shift to its mode of operation opening gate 44. Similarly at the end of the scan, the light beam from source 21 also impinges on photo assembly 38 as it leaves seismogram S causing a pulse to be passed through trigger and pulse-shaping circuit 42 causing multi-vibrator 45 to shift to its mode of operation closing gate 44 and resetting each of multi-vibrators 50, 51 and 52 of sequence selector 13 to their first modes of operation. As each of the rays of light from sources 20 and 21 are reflected across seismogram S, photo assemblies 35 and 36 are actuated by a ray of light crossing a trace T. Pulses are passed from phototube assemblies 35 and 36 through and pulse-shaping circuits 40 and 41 respectively to input circuits 80 through condensers 63 of gates 14 and to the input circuit of gate 44 respectively. The pulses from trigger and pulse-shaping circuit 41 are passed through gate 44 to circuit 48 since just prior to commencing the scan the ray of light impinged on phototube assembly 37 causing gate 44 to open. Such pulses from gate 44 are delivered through output circuit 48 to multi-vibrators 50, 51 and 52 eight times during the scan, once for each trace. By reason of the binary counter arrangement in which multi-vibrators 50, 51 and 52 are connected, the eight possible combinations of circuits 53–58 are momentarily grounded in sequence as each trace T is crossed by the ray of light from the source 21 thereby conditioning gates 14 to operate in sequence. At the same time as the ray of light from source 21 scans across seismogram S, the ray of light from source 20 also scans seismogram S on the portion beneath lens 27. Upon crossing each trace T, as described above, a positive pulse is shaped in circuit 40 and is coupled through condenser 63 to the input at gate 14. It will be apparent that only pulses coupled through condenser 63 at the instant of a momentary actuation of gate 14 by grounding of three of circuits 53–58 will pass through the gate 14 to an output circuit 15. Hence pulses corresponding to the ray of light from source 20 crossing traces T only actuate output circuits 15 after they coincide in time with the crossing of the ray of light from source 21 across a trace T at its quiescent position. Therefore, as the pulses forming the program signal selectively condition gates 14 one at a time, a signal in output circuit 15 occurs when the position of the trace T crossed by the ray of light from source 20 coincides with the axis (quiescent) position of trace T, and a different output circuit 15 will thus be uniquely associated with each trace T except in accidental cases of extreme interlacing at the instant a trace crosses the base line of another trace.

It will be apparent that as the scan is completed the impingement of the ray of light from source 21 upon tube assembly 38 closes gate 44 which had been previously open, thereby preventing further actuation of sequence selector 13. Sequence selector 13 is reset through the shifting of mode of operation of multi-vibrator 45 until the ray of light from source 21 again commences its scan and impinges on phototube 37 to reset gate 44 to pass signals from phototube 36. It will be apparent that motor 32 is operated to draw seismogram between the rollers 31 and 33 as the scanning proceeds such that each successive scan will be incrementally displaced along the seismogram with the previously scanned portion of the seismogram being drawn into loop L. The speed of motors 32 and 18 should be synchronized with whatever devices channels 15 are connected, for example, if channels 15 are connected to energize mechanical recording heads, it is desirable to correlate the speed of motor 32 with the speed of the recording drum motor such that the mechanical recording formed has the conventional time basis. Synchronization can be accomplished by conventional techniques which form no part of this invention. It will also be apparent that the outputs of the various channels 15 will consist solely of electric pulses spaced from each other in time and hence can conveniently be utilized to gate high speed counters and thus convert the information which they represent into digital signals for further processing.

I claim:

1. A scanning and sorting device for reproducing as an electrical signal information graphically recorded in the form of a trace varying in amplitude about an axis which includes scanning means for repeatedly scanning transversely across said trace, each scan being incrementally displaced in the direction of said axis from the preceding scan, said scanning means having an output circuit developing an output signal responsive in time to the position of said trace on each scan, programming means operable in synchronism which said scanning means having an output circuit developing an output signal at the point in time each scan is at the position of said axis, an output channel having two input circuits, said output channel developing an electric signal when both input circuits thereto are simultaneously actuated, one input circuit of said output channel being connected to the output circuit of said scanning means, and the other input circuit of said output channel being connected to the output circuit of said programming means.

2. A scanning and sorting device for reproducing as separate electric signals information graphically recorded in the form of a plurality of traces varying in amplitude about parallel axes which includes scanning means for repeatedly scanning transversely across said traces in sequence, each scan being incrementally displaced in the direction of said axes from the preceding scan, said scanning means having an output circuit developing an output signal responsive in time to the position of each trace on each scan, programming means operable in synchronism with said scanning means having an output circuit developing an output signal at the point in time each scan is at a position of a said axis, a plurality of output channels each corresponding to a said trace and having two input circuits, each of said channels developing an electric signal when both input circuits thereto are simultaneously actuated, a sequence controller having an input circuit and a plurality of output circuits responsive to signals in the input circuit thereof sequentially to actuate the output circuits thereof, each output circuit of said sequence controller being connected to one input circuit of a different one of said output channels, the input circuit to said sequence controller being connected to the output circuit of said scanning means, and all of the remaining input circuits of said output channels being connected to the output circuit of said programming means.

3. The scanning and sorting device of claim 2 including means to reset the sequence controller to its initial position upon the completion of each traverse scan.

4. The scanning and sorting device of claim 2 including gating means connected between the output circuit of said scanning means and said sequence controller and actuated at the initiation of each trace to the open position of said gating means.

5. A scanning and sorting device according to claim 4 including bistable switching means actuated by said scanning means and operable in its first mode at the initiation of each scan to open said gating means, and operable in its second mode in the completion of each scan both to close said gating means and to reset said sequence controller to its initial position.

6. A scanning and sorting device for reproducing as separate electric signals information graphically recorded in the form of a plurality of traces varying in amplitude about parallel axes which includes scanning means for repeatedly scanning transversely across said traces in sequence, each scan being incrementally displaced in the direction of said axes from the preceding scan, said scanning means having an output circuit developing an output signal responsive in time to the position of each trace on each scan, programming means operable in synchronism with said scanning means having an output circuit developing an output signal at the point in time each scan is at a position of a said axis, a plurality of output channels each corresponding to a said trace and having two input circuits, each of said channels developing an electric signal when both input circuits thereto are simultaneously actuated, a sequence controller having an input circuit and a plurality of output circuits responsive to signals in the input circuit thereof, sequentially to actuate the output circuits thereof, each output circuit of said sequence controller being connected to one input circuit of a different one of said output channels, the input circuit to said sequence controller being connected to the output circuit of said programming means, and all of the remaining input circuits of said output channels being connected to the output circuit of said scanning means.

7. The scanning and sorting device according to claim 6 including means to reset the sequence controller to its initial position upon the completion of each traverse scan.

8. The scanning and sorting device according to claim 6 including gating means connected between said output circuit of said programming means and said sequence controller and actuated at the initiation of each trace to the open position of said gating means.

9. A scanning and sorting device according to claim 8 including bistable switching means actuated by said programming means and operable in its first mode at the initiation of each scan to open said gating means, and operable in its second mode at the completion of each scan both to close said gating means and to reset said sequence controller to its initial position.

References Cited

UNITED STATES PATENTS

| 2,463,534 | 3/1949 | Hawkins | 250—219 |
| 2,961,547 | 11/1960 | Snavely | 250—219 |
| 2,968,793 | 1/1961 | Bellamy | 250—219 |
| 3,003,066 | 10/1961 | Snavely | 250—219 |
| 3,033,990 | 5/1962 | Johnson | 250—219 |
| 3,059,119 | 10/1962 | Zenor | 250—219 |
| 3,166,675 | 1/1965 | Dedden et al. | 250—219 |
| 3,209,321 | 9/1965 | Woods | 250—219 |

RALPH G. NILSON, *Primary Examiner.*

M. A. LEAVITT, *Assistant Examiner.*